United States Patent
Malme

[15] 3,657,648
[45] Apr. 18, 1972

[54] ELECTRICAL TESTING DEVICE
[72] Inventor: Elmer K. Malme, St. Charles, Ill.
[73] Assignee: Wire Sales Company, Chicago, Ill.
[22] Filed: Feb. 8, 1971
[21] Appl. No.: 113,479

[52] U.S. Cl..................................324/122, 324/133
[51] Int. Cl..................................G01r 13/36, G01r 19/14
[58] Field of Search.................324/122, 133, 72.5, 149, 51

[56] References Cited

FOREIGN PATENTS OR APPLICATIONS 683,997  12/1952  Great Britain........................324/72.5

Primary Examiner—Rudolph V. Rolinec
Assistant Examiner—Ernest F. Karlsen
Attorney—Robert L. Kahn

[57] ABSTRACT

An electrical testing device has an electrically insulating housing with one projecting electrode and another insulated wire containing a second projecting electrode. A neon tube is included within the housing and gives a visual indication of voltage. The exposed electrodes are generally spade-shaped to permit introducing the same into the slots of a conventional receptacle to determine if the receptacle electrodes are live. In addition, the testing device also has an auxiliary electrode within a slotted portion of the housing.

2 Claims, 4 Drawing Figures

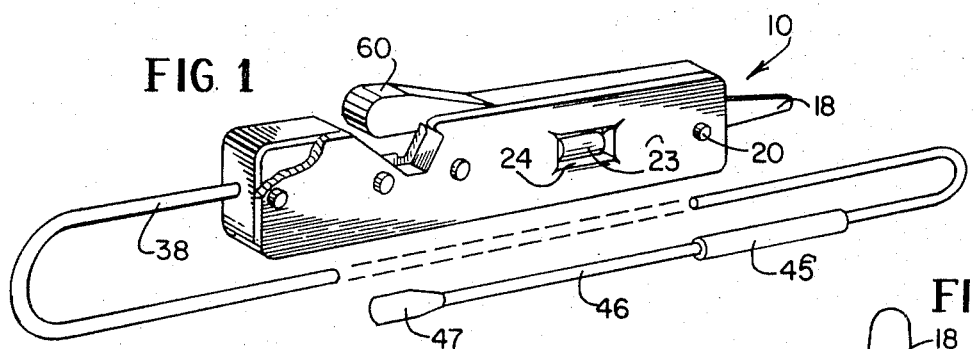
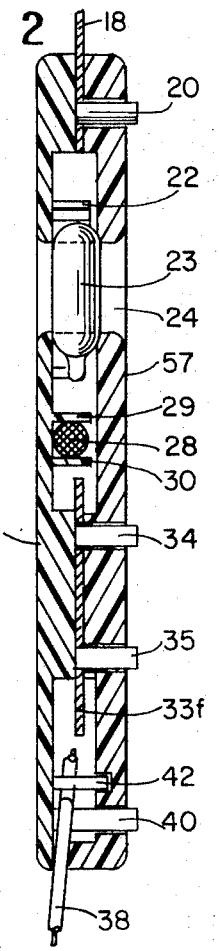
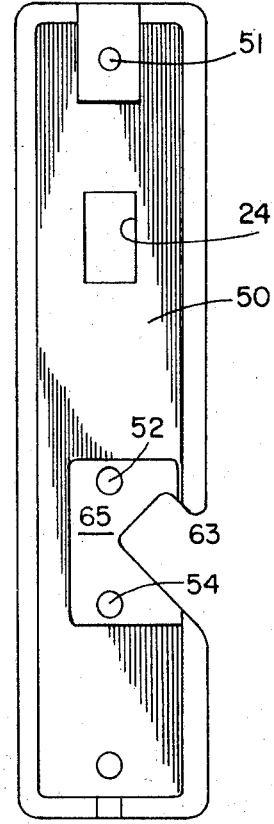
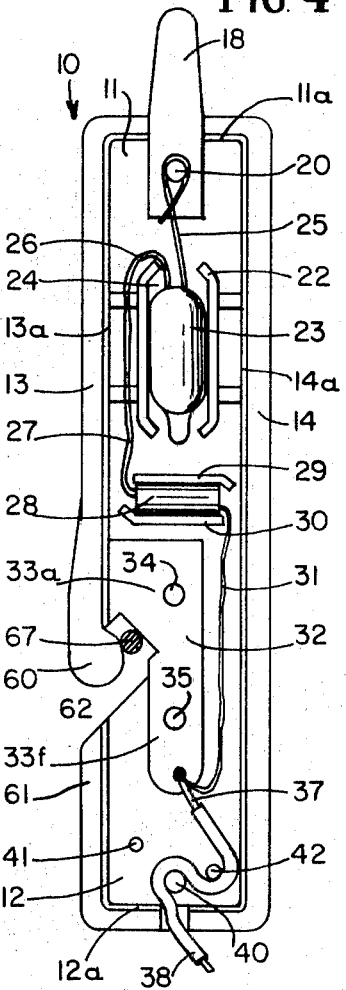
Inventor
ELMER K. MALME
BY
Robert S. Kahn
ATTY.

ELECTRICAL TESTING DEVICE

This invention relates to an electrical testing device and makes possible a device which can be generally used in connection with electrified fences as well as low power circuits generally wherein voltages involved are no more than several hundred volts. A device embodying the present invention is adapted to indicate whether a circuit is live, providing the voltage is at least above 50 or so volts. In addition, the new device has means for permitting the same to be hung or supported from a generally horizontal wire such as a length of wire fence together with a flexible lead carrying a probe in the end thereof for grounding.

The device employing the present invention consists of an elongated plastic housing of electrically insulating material so dimensioned as to be readily held in the palm of a person's hand. The housing contains a small neon bulb or lamp which may be viewed through a window in the housing to determine if the lamp is on or off. The housing itself has an insulated wire extending from one end thereof and terminates in a metal probe and also has an additional metal probe extending beyond the housing end remote from the wire. The testing device has a housing so shaped as to permit the same to be hung or supported from a generally horizontal wire adapted to contact an electrode carried by said housing but normally not accessible to the fingers of any hand.

As a result, the supporting wire when bare will be connected to a terminal of the flexible but insulated electric wire. Preferably the electrodes at an end of the insulated wire and at the end of the housing are so shaped as to be insertable into standard 120 or 240 volt 60 cycle sockets or receptacles. Thus, apart from testing the condition of an electric fence (charged from an electric fence charging system), the new device may be used to test 120 or 240 volt circuits to indicate the presence or absence of voltage therein.

For an understanding of the invention reference will now be made to the drawings wherein:

FIG. 1 is a perspective view of the new device embodying the present invention.

FIG. 2 is a longitudinal section along line 2—2 of FIG. 1.

FIG. 3 is a plan view of the cover plate of the housing.

FIG. 4 is a plan view of the housing proper showing the various components of the testing device located within the housing.

Referring now to the drawings, the device has elongated housing base 10 with one end 11, remaining end 12 and sides 13 and 14 extending between such ends. Housing base 10 has a generally flat shape at the outer bottom face 16. Housing base portion 10 is shallow and has, as seen in FIG. 4, upwardly extending sidewalls along portions 11 to 14 inclusive. The sidewall portions adjacent the top are rabbetted at 11a, 12a, 13a and 14a. At the ends 11 and 12 of housing base portion 10, the sidewalls are undercut below the rabbets to accommodate outwardly extending portions of the device extending through such sidewalls. Thus at end 11 of housing base 10, the sidewall cut-out permits fixed electrode probe 18 to extend from the interior of the housing base to the exterior thereof.

Electrode 18 is a flat strip of metal whose plane is generally parallel to the bottom of the housing base and extends longitudinally of such base. Probe electrode 18 is apertured at an end to permit sliding the inner end of electrode 18 down over a round guide pin 20 forming part of the body of the housing base 10 and normally extending upwardly from the housing base. Preferably the surface of housing base 10 in the vicinity of pin 20 is elevated to permit electrode 18 to rest flat against the base material. Parts of the electrode and base material cooperate so that elongated electrode 18 can lie flat as illustrated in the drawings and be restrained against all movement except along the length of guide pin 20 when the housing base 10 has its top open as illustrated in FIG. 4.

The inner face of housing base 10 is shaped to provide cradle 22 within which small neon lamp 23 may rest. The lamp is supported in such manner that the lamp length is parallel to the housing length. In order to provide for a view from the outside of lamp 23, window 24 in the bottom of housing 10 is provided. Lamp 23 is provided with leads 25 and 26 and the lamp is adapted to glow when such leads have impressed thereon suitable potential of the order of about 50 volts or more. Lead 25 is long enough to extend to guide pin 20 and be looped around the guide pin. Lead 26 of the lamp extends within housing bottom 10 laterally of the lamp and is connected to lead 27 of ballast resistor 28 positioned within laterally extending sidewalls 29 and 30 extending upwardly from the bottom of housing base 10.

Resistor 28 may have any desired value usually in the order of about one-half megohm or more. Resistor 28 has its remaining lead 31 extending within housing base 10 along the length thereof and is soldered to flat electrode plate 32. Electrode plate 32 is of stamped metal having an irregular shape and provided with at least one or more apertures 33a and 33b adapted to permit it to be slid over guide pins 34 and 35 of plastic integrally molded with housing base 10. These guide pins extend straight up from the bottom of housing base 10 and support plate electrode 32 against movement except in the direction of the guide pins.

Soldered to electrode plate 32 is an end of wire 37 having high potential insulation 38. Insulation 38 is heavy enough to protect against voltages of the order of 500 or the like and both the wire and insulation are sufficiently flexible so that the insulated wire may be considered as a flexible insulated wire lead frequently used on meters and various test devices. For anchoring insulated wire lead 38 within housing base 10, guide pin 40 adjacent the undercut sidewall portion of housing end 12 is provided. Preferably all guide pins 20, 34, 35 and 40 are disposed along a straight line extending along the center of housing portion 10.

In addition to guide pin 40 and adjacent thereto, small auxiliary posts 41 and 42 laterally offset from but parallel to guide pin 40 are provided. These auxiliary posts 41 and 42 are shorter than aligned guide pins 20, 34, 35 and 40. The function of posts 41 and 42 is to provide additional pins about which wire 38 may be looped. The spacing and distance of pins 40 to 42 inclusive are such that the sharp turns made by the bent wire will effectively hold the wire from any pull on the soldered joint on electrode plate 32.

Wire 38 may have any desired length, usually about 2 or 3 feet, and carries at its outer end a short piece 45 of electrically insulating stiff plastic tube material. Tube 45 within the interior or thereof will accommodate the bared end of wire 37 and has connected thereto stiff metal probe 46. Metal probe 46 preferably has flattened spade shaped tip 47. The shape and thickness of electrode 18 and tip 47 are such that they can be inserted into conventional 60 cycle AC wall sockets adapted to accommodate conventional plugs having two parallel laterally offset blades for insertion into such sockets.

Housing base 10 is provided with a generally flat cover plate 50 of electrically insulating plastic material. The material out of which the housing base and cover are made has sufficient rigidity and strength for the purpose required. Top 50 is provided with apertures 51 to 54 inclusive adapted to register with and accommodate guide pins 20, 34, 35 and 40. Guide pins 20, 34, 35 and 40 are long enough to project beyond the outer face 57 of top 50 and when the housing is assembled. Means for locking the covers or spreading the pin ends with hot irons may be used. Insofar as auxiliary pins 41 and 42 are concerned, these pins may project into the cover or not. It is preferred to have these auxiliary pins, which are smaller in diameter than the large guide pins, extend within recesses or pockets of cover 50 to support auxiliary pins against bending in case of a pull on wire 38.

Housing base portion 10 has along one long side of the side of said base portion shaped to form claw 60 which is short of portion 61 of side 13 of the housing base so that bay 62 extending inwardly toward the interior of the housing is provided. Cover portion 50 of the housing has bay 63 which normally registers with opening 62 of the base portion. Bay 63 in the cover is somewhat larger and has boss portion 65 which is adapted to cooperate with electrode plate 32 in maintaining the plate tightly against the bottom of the housing base.

As shown in FIG. 1, a portion of electrode plate 32 projects beyond the edge of the insulating and cover portions. The shape and orientation of the bay in the housing is such that the testing device may be hung on a fence wire shown in section at 67. Electrically, as shown here, wire 67 for supporting the testing device would be at the same potential as spade tip 47 of the probe electrode. This will permit the device to be supported with the probe at the insulated wire end to be put into the ground. This will permit work on a live fence without danger.

The arrangement of the bays in the housing base and housing cover is such and the dimensions of the electrode plate are such that while a bare wire can readily contact the electrode when the tester is hung, a person holding the tester will ordinarily not be able to contact the electrode edge within the bay.

What is claimed is:

1. An electrical circuit testing device comprising: a generally flat elongated shallow housing of electrically insulating plastic, a plurality of guide pins extending upwardly from the bottom of the housing, certain of said pins being positioned along a line of said housing and extending beyond the open top of said housing, said housing having sidewalls with cut-outs at the housing ends, there being a guide pin near each housing end, a flat metal probe member apertured to permit said probe member to slip over a pin and having a portion extending through the sidewall cut-out to project beyond the housing, said housing bottom under the probe member being shaped to provide a seat in which said probe member is retained and restrained against movement except along the length of said guide pin, said housing being shaped to provide a retaining pocket for a small neon glow lamp with the housing bottom having a window therethrough, said lamp having two leads, one lead extending toward said probe member and being connected to said guide pin, the other lead extending away from the probe member along the housing length, a ballast resistor lying in a pocket in said housing bottom, said other lamp lead being connected to one resistor terminal, the other resistor terminal being a wire lead extending away from the lamp, a flat metal electrode in said housing connected to said other resistor lead and apertured to permit said electrode to slip over at least one guide pin, said electrode being beyond said resistor along the housing length and being near the bottom of a bay in the housing side and bottom, said bay being shaped so that the housing may be hung over a wire with the wire being able to contact the edge of said flat metal electrode, a heavily insulated length of wire having one wire end connected to said flat metal electrode and curled about guide pins and extending through the sidewall of the housing at the end remote from the first metal probe, and a second metal probe supported from and connected to the free wire end, a top for said molded housing of insulating material, said top having a window therethrough registering with the housing window, said top having molded bosses for pressing against the metal parts and insulated wire in said housing to lock the same whereby said device may be used for testing for electrical potentials between said first probe as one electrode and said flat electrode or second probe as the other electrode.

2. The device according to claim 1 wherein said bays and electrode plate are so dimensioned and shaped that while a bare wire may readily contact the electrode edge in said bay when said device is hung on a wire, a person holding the device cannot readily reach the electrode portion in said bay with his fingers.

* * * * *